(No Model.)

J. W. & V. W. MACY.
HAY LOADER.

No. 296,591. Patented Apr. 8, 1884.

Witnesses:
Theo. Munger.
John T. Morrow

Inventors:
J. W. Macy and V. W. Macy
by Anderson & Smith
their attorneys (No Model.) 3 Sheets—Sheet 2.
J. W. & V. W. MACY.
HAY LOADER.
No. 296,591. Patented Apr. 8, 1884.
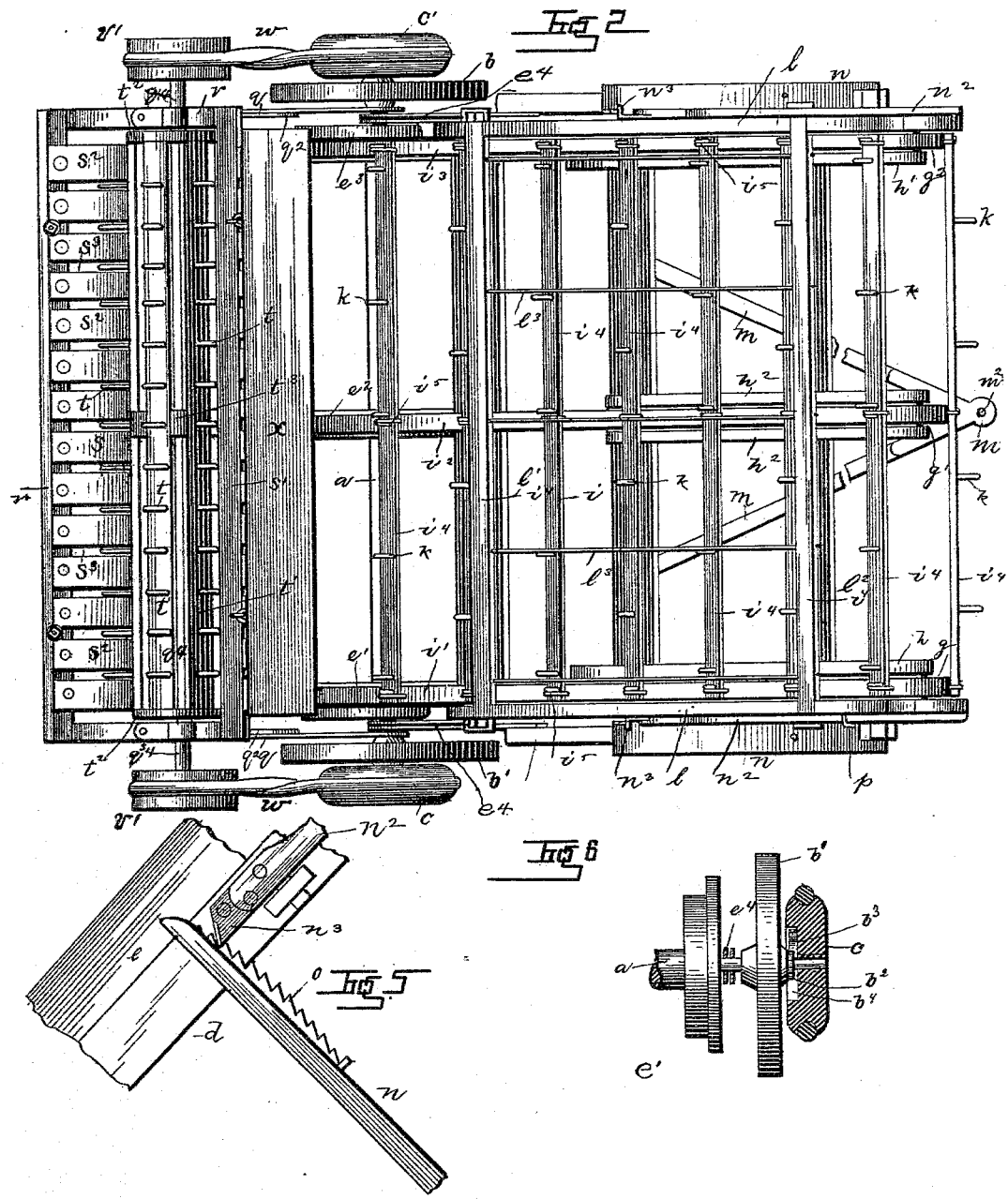

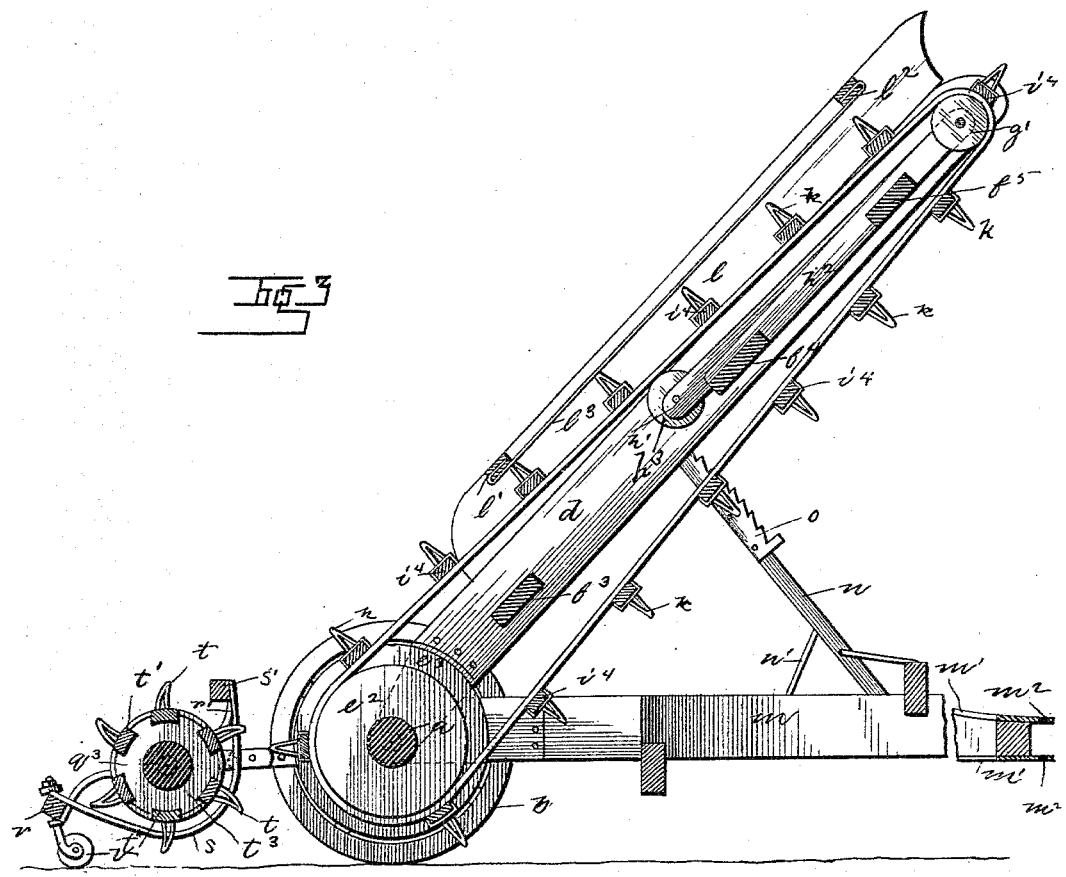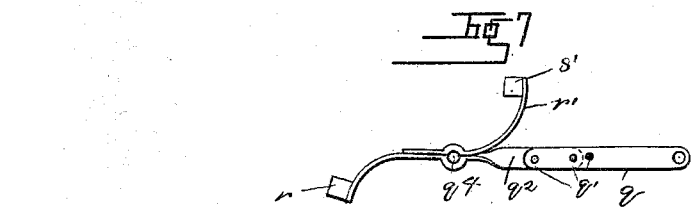

UNITED STATES PATENT OFFICE.

JASON W. MACY AND VOLNEY W. MACY, OF SEARSBOROUGH, IOWA.

HAY-LOADER.

SPECIFICATION forming part of Letters Patent No. 296,591, dated April 8, 1884.

Application filed October 16, 1883. (No model.)

*To all whom it may concern:*

Be it known that we, J. W. MACY and V. W. MACY, citizens of the United States, residing at Searsborough, in the county of Poweshiek and State of Iowa, have invented certain new and useful Improvements in Hay-Loaders; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
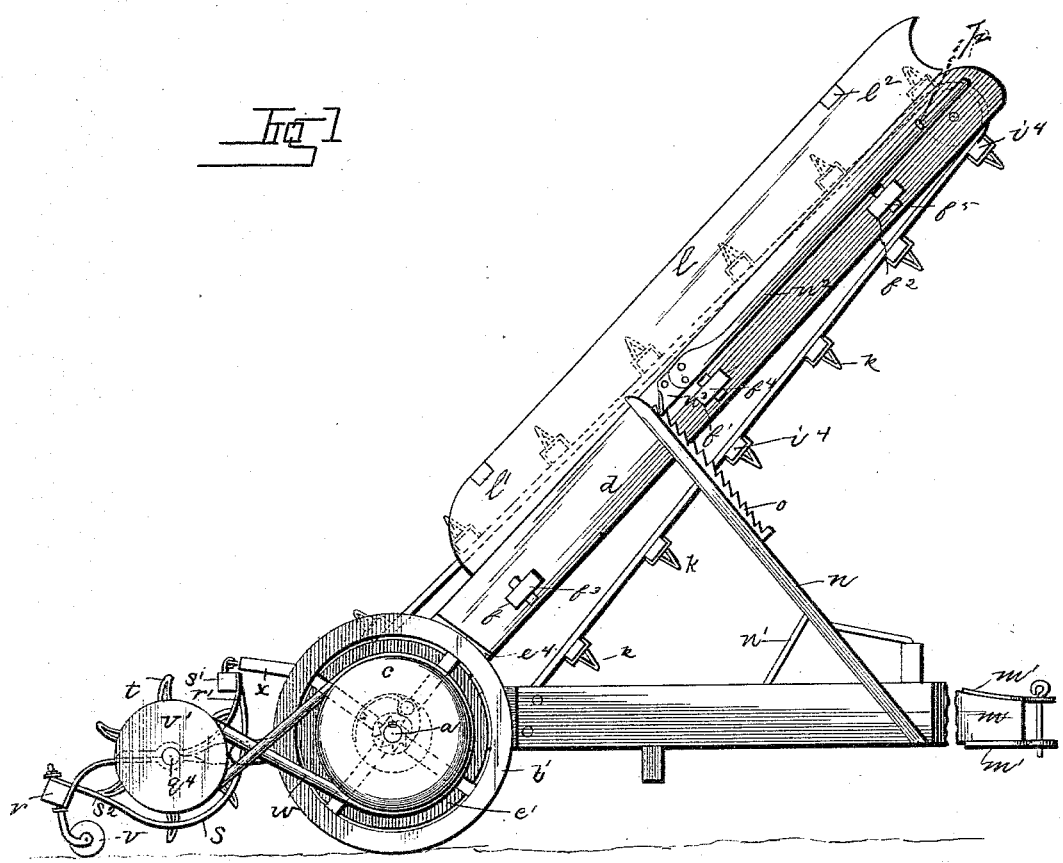
Figure 4:
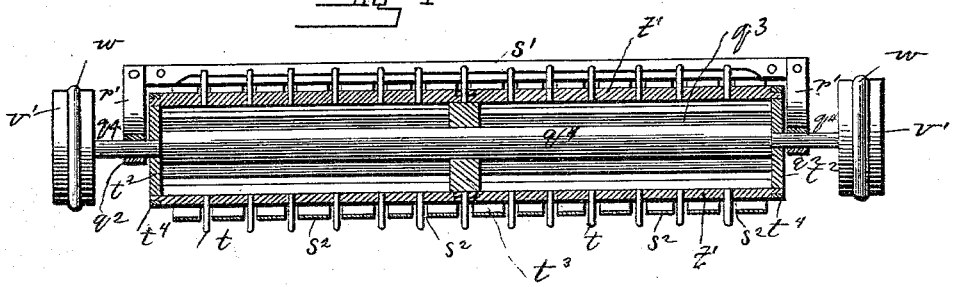

Figure 1 of the drawings is a side elevation of the hay-loader. Fig. 2 is a plan view. Fig. 3 is a vertical longitudinal sectional view, and Figs. 4, 5, 6, and 7 are detail views.

This invention has relation to hay-loaders; and it consists in the construction and novel arrangement of devices, as will be hereinafter fully described, and particularly pointed out in the claims appended.

This hay-loader is designed to be coupled to the rear end of a farm-wagon driven around the field to convey the hay from the ground to the wagon, where it is received and properly distributed by some person on the wagon to form the load of hay, after which the loader may be temporarily detached and the load driven to its destination.

Referring by letter to the accompanying drawings, $a$ designates the main axle or driving-shaft of the hay-loader, which is mounted on the supporting and driving wheels $b$ and $b'$. The driving-wheel $b$ at the left-hand side of the machine is keyed to the shaft or axle $a$, and they revolve together under all circumstances when the machine is in motion. The supporting-wheel $b'$ is not keyed to the axle $a$; but for portions of the time it also acts as a driving-wheel. The outer end of the hub of this wheel $b'$ is provided with a ratchet, $b^2$, and a spring-pawl, $b^3$, pivoted in a recess, $b^4$, in the inner face of a grooved flanged pulley, $c$, on the right end of the main shaft $a$, engages the ratchet $b^2$ when the machine is moving forward, and causes the wheel $b'$ to act as a driving-wheel. When, however, the machine is turned to the right, the spring-pawl $b^3$ will slip over the ratchet-teeth and permit the machine to be turned without causing the slipping of the wheel $b'$ upon the ground, which would occur were the wheel $b'$ keyed to the shaft $a$. The left-hand end of the main shaft $a$ is also provided with a fixed flanged pulley, $c'$.

Between the wheels $b$ and $b'$, and also between the side rails, $d$, of the elevator-frame, the main shaft $a$ is provided with three pulleys, $e'\ e^2\ e^3$. The pulleys $e'\ e^3$ are flanged pulleys, the flanges being in line with the side rails, $d$, of the elevator-frame, while the middle pulley, $e^2$, is without a flange. The side rails, $d\ d$, of the elevator-frame are pivoted on the main shaft $a$ by the shaft being passed through openings in the lower ends of the metal extensions $e^4\ e^4$ of the side rails, $d\ d$, outside of the flanged pulleys $e'\ e^3$. The side rails, $d\ d$, are mortised through at $f\ f'\ f^2$, and are connected by tenoned cross-bars $f^3\ f^4\ f^5$, keyed in place. The elevator-frame is provided with three upper small pulleys, $g\ g'\ g^2$. The pulleys $g$ and $g^2$ have their bearings in the upper ends of the side rails, $d\ d$, and the upper ends of the parallel strips $h\ h'$. The middle upper pulley, $g'$, has its bearings in the upper ends of the parallel strips $h^2\ h^2$. The three middle rollers or pulleys of the elevator-frame have their bearings between the parallel strips just described and the side rails at the lower ends of said parallel strips. Each of the parallel strips is secured to the cross-bars $f^4\ f^5$, as shown.

The endless carrier $i$ is composed of three belts, $i'\ i^2\ i^3$, connected by cross-slats $i^4$. These slats $i^4$ are secured to the three belts $i'\ i^2\ i^3$ by staples $i^5$, which are driven through the belts from their inner sides, and the projecting ends of the staples $i^5$ are turned down inwardly and clinched over the middle and near the ends of the slats, thereby making a secure fastening, without danger of splitting the slats. The three belts run over the flanged pulleys and the intermediate smooth pulley on the main shaft $a$, and over the upper and middle smaller pulleys just described. The slats $i^4$ are thickly set with pointed staple-teeth $k$ for drawing up the hay or other material to be loaded. By making the teeth $k$ in the form of pointed staples great strength is obtained with less weight of material and less liability of splitting the slats than where a single sprig is employed as a tooth; and, further, by being tapering, as shown, the teeth discharge the hay much better at the top, and do not tend to draw the hay under the carrier. The side rails, $d\ d$, are provided on their upper edges with side-boards $l\ l$, which extend from their upper to near their lower ends. These sides boards $l\ l$ are connected by cross-bars $l'\ l^2$ near their upper and lower ends. These cross-bars $l'\ l^2$ are preferably let into recesses in the edges of the side-boards $l\ l$, and are connected by parallel wires $l^3$. The side-boards, connecting cross-bars, and parallel wires are designed to prevent the hay from being blown from the elevator when the loader is being used in windy weather.

The elevator-frame $d$ is adjustable upon the main shaft $a$ to raise or lower its upper end, so that the load may be built gradually higher by elevating said frame, and said frame may be lowered to commence a new load after one has been built. The main or supporting frame is hinged to the main shaft, and is braced by forwardly-extending hounds $m$, which meet at their forward ends, and are strengthened at their meeting-points by castings $m'\ m'$ above and below. These castings $m'\ m'$ have eyes $m^2$, through which a coupling-pin may be passed to couple the loader to the wagon. From the sides of the main frame, at its front, rise two inclined posts, $n\ n$, which are thoroughly braced at $n'\ n'$, and are provided on their inner faces, commencing at their upper ends, with racks $o\ o$, curved on an arc having the main shaft as a center. The teeth of the rack project forward. The side rails, $d$, of the elevator-frame are provided on their outer faces, above the points where the posts $n\ n$ intersect them, with pivoted levers $n^2\ n^2$, having dogs $n^3\ n^3$ for engaging the teeth of the arc-racks $o\ o$. Pivoted catches $p\ p$, near the upper ends of the side rails, $d\ d$, engage the levers $n^2\ n^2$, and hold the elevator-frame in its adjusted position.

The rake-frame is also pivoted to the main shaft $a$, and extends rearwardly therefrom. The arms $q\ q$ of the frame are provided with a series of bolt-holes, $q'$, near their rear ends. Arms $q^2\ q^2$, having a series of corresponding bolt-holes, $q'$, in their front ends, are twisted in rear of said bolt-holes, to present a lateral portion to form bearings for the shaft $q^4$ of the revolving rake $q^3$. These lateral portions are swaged downward to form the lower halves of the journal-boxes for the rake-shaft, and from these points they are curved downward and terminate in angular plates extending inwardly to form the bearings for the lower rear cross-bar, $r$, of the rake-guard $s$. Bars $r'\ r'$ are swaged upward to form the upper halves of the journal-boxes for the rake-shaft, and curve forward and upward and terminate in angular plates, which form strong bearings for the upper front cross-bar, $s'$, of the rake-guard $s$. The cross-bars $r$ and $s'$ are connected by strong sheet-metal strips, $s^2$, which curve downwardly and rearwardly from the bar $s'$ around the revolving rake $q^3$, and have spaces $s^3$ between them for the passage of the teeth $t$ on the rake-heads $t'$. The rake-heads $t'$ are let into recesses in the circular end disks, $t^2$, and the middle disk, $t^3$, and iron bands $t^4$ are shrunk around them at these points to give them great strength.

The teeth $t$ of the rake-heads $t'$ consist of pointed staples, which are bent backward to form a curve which is gradual, so that they will not hook into the hay and cause delay. The spaces between the concave sheet-metal strips are only wide enough to permit a free passage of the rake-teeth, and the sheet-metal strips are bent at a proper curve that will cause them to nearly touch the rake-heads. By thus forming the concave the rake-teeth are allowed to project far enough below at or under the lower center to gather up the swaths, and push them forward and up the convex side of the concave until the rake-teeth pass into the concave at its upper end, leaving the hay to be caught by the teeth of the carrier and carried up onto the loaded hay on the wagon.

The rake-guard is mounted on two small caster-wheels, $v\ v$, which adapt it to inequalities of the ground over which the machine passes. The rake-shaft is provided with a fixed grooved pulley, $v'\ v'$, at each end. These pulleys are connected by crossed belts $w\ w$ with the grooved pulleys on the ends of the main shaft $a$. A float, $x$, is hinged to the upper cross-bar of the rake-guard, and presses the hay, as it passes onto the elevator, gently downward, thereby preventing any clogging near the concave.

In operation it is only necessary to couple the hay-loader to the rear of the farm-wagon and drive around the field. It will load two swaths as fast as the team can walk, and only requires two hands—a driver and one to build the hay on the wagon.

The perforated arms of the hay-rake render the rake adjustable to light and heavy hay by moving the rake toward or away from the elevator.

Having thus fully described our invention, what we claim as new, and desire to secure by Letters Patent, is—

1. In a hay-loader, the revolving rake composed of the recessed circular middle and end disks, and the rake-heads let into said recesses and held in place by iron bands shrunk over them and around the middle and end disks, substantially as specified.

2. In a hay-loader, the combination of the elevator, the elevator-frame, the side rails, the tenoned cross-bars keyed in mortises in said side rails, the longitudinal parallel strips secured to the upper and middle cross-bars between said side rails, and the upper and middle pulleys for carrying the elevator-belts journaled in said strips and side rails, substantially as specified.

In testimony whereof we affix our signatures in presence of two witnesses.

JASON W. MACY.
VOLNEY W. MACY.

Witnesses:
SAMUEL F. COOPER,
GEO. H. HAMLIN.